United States Patent [19]

Hankinson et al.

[11] Patent Number: 4,828,789

[45] Date of Patent: May 9, 1989

[54] REACTOR VESSEL HEAD PERMANENT SHIELD

[75] Inventors: Michael F. Hankinson, Monroeville, Pa.; Robert J. Leduc, Columbia, Md.; Joseph W. Richard, West Mifflin; Louis J. Malandra, Elizabeth Township, Allegheny Co., both of Pa.

[73] Assignee: Westinghouse Electric Corp., Pittsburgh, Pa.

[21] Appl. No.: 576,644

[22] Filed: Feb. 3, 1984

[51] Int. Cl.4 .............................................. G21C 11/02
[52] U.S. Cl. ................................. 376/287; 250/517.1; 376/263; 376/285
[58] Field of Search ..................... 250/517.1; 376/219, 376/262, 263, 285, 287, 463

[56] References Cited

U.S. PATENT DOCUMENTS

| | | | |
|---|---|---|---|
| 2,920,025 | 1/1960 | Anderson | 376/219 |
| 3,226,300 | 12/1965 | Zmola et al. | |
| 3,752,737 | 8/1973 | Frisch et al. | |
| 3,801,448 | 4/1974 | Brandstetter et al. | |
| 3,836,429 | 9/1974 | Frisch et al. | |
| 3,836,430 | 9/1974 | Frisch et al. | 376/263 |
| 3,857,442 | 12/1974 | Sturiale et al. | |
| 3,899,393 | 8/1975 | Dorner et al. | |
| 3,914,613 | 10/1975 | Schallenberger et al. | |
| 3,926,722 | 12/1975 | Dupen | |
| 4,070,241 | 1/1978 | Pennell et al. | |
| 4,071,404 | 1/1978 | Aoki | |
| 4,124,447 | 11/1978 | Gross | |
| 4,126,515 | 11/1978 | Klotz et al. | |
| 4,299,658 | 11/1981 | Meuschke et al. | 376/260 |
| 4,300,056 | 11/1981 | Gagneraud | |
| 4,302,290 | 11/1981 | Mazur et al. | |
| 4,310,034 | 1/1982 | Guilloteau et al. | |
| 4,432,932 | 2/1984 | Jacobson | 376/287 |
| 4,530,813 | 7/1985 | Jacobson | 376/287 |
| 4,654,188 | 3/1987 | Hankinson | 376/287 |
| 4,678,623 | 7/1987 | Malandra et al. | 376/463 |
| 4,708,843 | 11/1987 | Desfontaines et al. | 376/219 |

OTHER PUBLICATIONS

Anthony V. Nero, Jr., A. Guidebook to Nuclear reactors, 1979, p. 82.

Primary Examiner—Harvey E. Behrend
Assistant Examiner—Richard W. Wendtland
Attorney, Agent, or Firm—D. C. Adeles

[57] ABSTRACT

A radiation shield (10) is comprised of three, equiangularly extending, arcuate sections (14) which are secured to the nuclear reactor pressure vessel closure head (12) so as to annularly surround the nuclear reactor control rod drive mechanisms (26) and thereby prevent radiation emanating from the mechanisms (26) from reaching maintenance personnel who may be operatively working within the peripheral section (20) of the closure head. The shield sections (14) are bolted together by fasteners (18) and are secured to closure head lift lugs (30) by means of mounting brackets (38) and transversely extending pins (36). Clevis assemblies (34) are also pinned to the mounting brackets (38) and lift lugs (30), and lift rods (32) are threadedly engaged with the clevis assemblies (34). In this manner, when the closure head (12) is lifted from its associated pressure vessel, the radiation shield (10) remains with the closure head (12). Thermocouple electrical connector and control rod drive mechanism coolant air exhaust port access panels (68) (74) are respectively provided within the radiation shield (10), and an emergency water-gas vent line (76) is likewise accommodated by an access panel (78) also defined within the radiation shield (10). The shield (10) is vertically spaced above the closure head (12) so as to define a gap (82) therebetween, and auxiliary hinged shield panels (192) may be secured along the bottom of the shield (110) to close the gap (182).

20 Claims, 3 Drawing Sheets

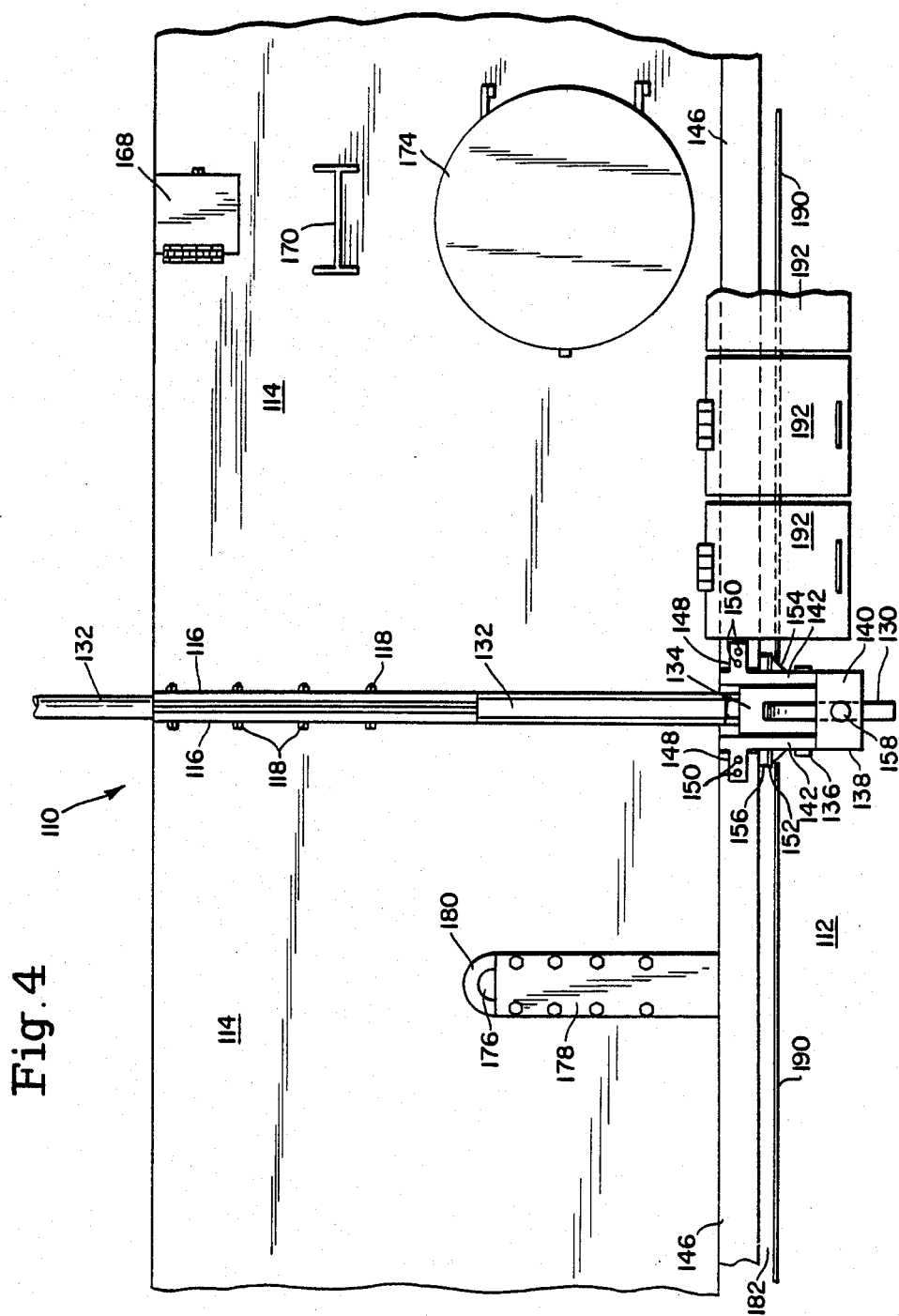

REACTOR VESSEL HEAD PERMANENT SHIELD

BACKGROUND OF THE INVENTION

1. Field of the Invention

The present invention relates generally to nuclear reactor facilities, and more particularly to a nuclear reactor pressure vessel having a permanent radiation shield removably attached to the upper external surface of the reactor pressure vessel closure head so as to protect maintenance personnel from exposure to the gamma radiation field originating at the reactor pressure vessel head or its appendages during performance of maintenance operations upon the pressure vessel closure head, such as, for example, detensioning and removal, or insertion and tensioning, of the reactor pressure vessel closure head studs in connection with the performance of refueling operations.

2. Description of the Prior Art

Prior to the performance of refueling operations in connection with, for example, pressurized water reactors (PWRs), the nuclear reactor pressure vessel closure head must first be removed. As is well known, the closure head is conventionally secured to the nuclear reactor pressure vessel by means of suitable, hydraulically actuated tension bolts or studs disposed in a circumferential array about the periphery of the closure head and pressure vessel. In particular, maintenance personnel utilize apparatus known as individual stud tensioners in order to hydraulically detension the bolts or studs whereby the same may be removed and stored, and similarly, upon completion of the refueling operations, the nuclear reactor pressure vessel closure head is replaced upon the reactor pressure vessel and the tension bolts or studs inserted and re-tensioned by means of the maintenance personnel again employing the hydraulic individual stud tensioner apparatus.

The nuclear reactor pressure vessel closure head has mounted thereon in an upstanding manner control rod drive mechanisms (CRDMs) which are provided for controlling the elevational positioning of the reactor control rods relative to the reactor core during performance of their control functions in connection with power plant power requirements. As a result of the power plant operation and the movement of the control rod drive mechanism drive rods relative to the nuclear reactor pressure vessel closure head, as well as the movement of the control rods within the core and the core barrel, highly radioactive deposits, known in the art as crud, tend to accumulate upon the control rod drive mechanisms within the vicinity of the nuclear reactor pressure vessel closure head and within the boundaries, for example, of the control rod drive mechanism cooling baffles which are provided for routing cooling air over the control rod drive mechanism coil stack assemblies in order to cool the same. It may therefore be readily appreciated that the maintenance personnel performing the aforenoted detensioning and removal, or insertion and tensioning, operations in connection with the nuclear reactor pressure vessel closure head studs or bolts during refueling operations are subjected to considerably significant or highlevel dosages of gamma radiation exposure.

In order to address the need for protecting the maintenance personnel from exposure to this highly radioactive gamma radiation field, portable radiation shields have been conventionally employed in such a manner that the same are either suspendingly or upstandingly supported upon the reactor pressure vessel head so as to surround the central hemispherical dome portion of the reactor pressure vessel head upon which the control rod drive mechanisms and their cooling baffles are mounted. While these radiation shields have therefore proven to be somewhat effective in achieving their radiation shielding functions so as to protect the maintenance personnel during the performance of their detensioning or tensioning operations upon the reactor pressure vessel closure head studs, considerable time is required in order to erect and dismantle the portable radiation shields in preparation for the stud detensioning and tensioning operations, respectively. These time requirements also affect the overall time requisites which must be accommodated within the entire time frame necessarily allotted to completion of the entire nuclear reactor refueling operations, and consequently, the provision of such portable radiation shields is not particularly cost effective in connection with the overall operation of the power plant.

In view of the foregoing, other attempts to resolve the conflicting problems of adequately protecting the maintenance personnel from excessive exposure to the highly radioactive gamma radiation field existing within the vicinity of the reactor pressure vessel closure head dome, in a cost-effective manner, have lead to the development of massive pieces of equipment known in the art as multiple stud tensioners. While such equipment or apparatus is therefore capable of performing de-tensioning or tensioning operations simultaneously in connection with a multitude of the reactor pressure vessel closure head studs or bolts, the cost of such equipment or apparatus is virtually prohibitive. Consequently, while such apparatus has therefore considerably reduced, or virtually eliminated, the need for the aforenoted radiation shielding in view of the fact that the de-tensioning or tensioning operations may be rapidly performed within a relatively short period of time, and therefore the time period within which the maintenance personnel are exposed to the existing radiation field present within the vicinity of the reactor pressure vessel head dome has been minimized, such apparatus is also not seen to be a cost-effective means for achieving the stud de-tensioning or tensioning maintenance operations while simultaneously protecting the maintenance personnel from exposure to the existing reactor pressure vessel closure head radiation field.

Accordingly, it is an object of the present invention to provide a new and improved nuclear reactor pressure vessel radiation shield.

Another object of the present invention is to provide a new and improved nuclear reactor pressure vessel radiation shield which overcomes the various drawbacks and operational disadvantages of prior art nuclear reactor pressure vessel radiation shields.

Yet another object of the present invention is to provide a new and improved nuclear reactor pressure vessel radiation shield which is economically cost-effective to fabricate, install, utilize, and maintain.

Still another object of the present invention is to provide a new and improved nuclear reattor pressure vessel radiation shield which permanently, but removably, attaches to the exterior surface of the pressure vessel closure head so as to peripherally surround the control rod drive mechanism (CRDM) assemblies and their assoociated cooling baffles.

Yet still another object of the present invention is to provide a new and improved nuclear reactor pressure vessel radiation shield which permanently, but removably, attaches to the exterior surface of the pressure vessel closure head so as to peripherally surround the control rod drive mechanism (CRDM) assemblies and their associated cooling baffles, yet be disposed radially within the circumferential array of tension bolts or studs disposed at the periphery of the pressure vessel closure head so as to protect maintenance personnel servicing the closure head tension bolts or studs from the radiation emitted within the region of the CRDM assemblies.

Still yet another object of the present invention is to provide a new and improved nuclear reactor pressure vessel radiation shield which permanently, but removably, attaches to the exterior surface of the pressure vessel closure head so as to readily facilitate the implementation of refueling operations without delaying the initiation of the refueling operations.

A further object of the present invention is to provide a new and improved nuclear reactor pressure vessel radiation shield which permanently, but removably, attaches to the exterior surface of the pressure vessel closure head which readily provides necessary access to various auxiliary equipment or system components located upon the closure head.

A yet further object of the present invention is to provide a new and improved nuclear reactor pressure vessel radiation shield which permanently attaches to the exterior surface of the pressure vessel closure head yet which is removable therefrom so as to provide necessary access to large areas of the closure head and equipment or systems operatively associated therewith when such equipment or systems require maintenance, service, replacement, or the like.

A still further object of the present invention is to provide a new and improved nuclear reactor pressure vessel radiation shield which is permanently, but removably, attached to the exterior surface of the pressure vessel closure head in such a manner as to accommodate existing structural components and equipment which are operatively associated with the closure head in a structurally integrated system.

A yet still further object of the present invention is to provide a new and improved nuclear reactor pressure vessel radiation shield which is permanently, yet removably, attached to the exterior surface of the pressure vessel closure head so as to be removable along with the pressure vessel closure head, if so desired, when the closure head is in fact removed from the nuclear reactor pressure vessel.

A still yet further object of the present invention is to provide a new and improved nuclear reactor pressure vessel radittion shield which is permanently, yet removably, attached to the exterior surface of the pressure vessel closure head which can accommodate thermal expansion of the closure head while the radiation shield of the present invention is attached to the closure head.

An additional object of the present invention is to provide a new and improved nuclear reactor pressure vessel radiation shield which is readily adaptable to existing nuclear reactor power plant facilities in a retrofittable manner.

SUMMARY OF THE INVENTION

The foregoing and other objectives are achieved in accordance with the present invention through the provision of a nuclear reactor pressure vessel radiation shield which is in the form of an upstanding cylindrical tube and is adapted to be secured to the exterior upper domed surface of the reactor closure head so as to peripherally surround the nuclear reactor control rod drive mechanisms (CRDMs) and the cooling baffles or shrouds operatively associated therewith, while also being simultaneously disposed radially inwardly of the nuclear reactor peripheral edge within which region there is provided the tension bolts or studs which connect the closure head to the reactor pressure vessel. The radiation shield may be fabricated, for example, from ASTM-A36 carbon type steel, and may be formed in three equiangularly arcuate sections which may be bolted together. The reactor pressure vessel closure head is conventionally provided with three lifting lugs equiangularly disposed in a circular array about the domed portion of the closure head to which lifting rods are operatively connected through the interdisposition of pin-clevis assemblies, the lifting rods, in turn, being operatively connected to a lifting rig whereby the entire closure head may be hoisted and removed from the pressure vessel by means of suitable crane or other hoist apparatus once the tension bolts or studs have been removed, or conversely, the closure head may be repositioned atop the pressure vessel upon, for example, completion of the refueling operations.

In order to fixedly, but removably, secure the radiation shield of the present invention to the closure head, suitable mounting bracket assemblies are attached to the pin-clevis assemblies, and the radiation shield sections are pinned to the mounting bracket assemblies so as to permit radial expansion of the closure head during reactor operation. The sidewalls of the radiation shield are also provided with suitable access openings to, for example, the fan air circulation ducts for conducting coolant air down over the CRDM assemblies and the coil stacks thereof, the reactor water coolant thermocouples, and the emergency water and gas vent line. In this manner, the radiation shield of the present invention is adapted to be permanently attached to the nuclear reactor pressure vessel closure head, yet the shield does not at all operationally interfere with any existing equipment, components, or systems of the reactor, and access may be gained to such components, or the like, when so required. In addition, as a result of the particular mounting of the radiation shield of the present invention upon the reactor pressure vessel closure head by means of the aforenoted mounting bracket assemblies, each one of the sections of the radiation shield is capable of remaining in its operative upstanding mode despite the fact that one or two of the other sections of the radiation sheild have been removed, for example, in order to provide required access for maintenance personnel to the CRDM assemblies or other equipment.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the different views, and wherein:

FIG. 4 is a side elevation view of a second embodiment of the new and improved permanently installed radiation shield of the present invention as may be mounted upon a nuclear reactor pressure vessel closure head in a manner similar to that shown in FIG. 1.

DESCRIPTION OF THE ILLUSTRATED EMBODIMENTS

Figure 1:
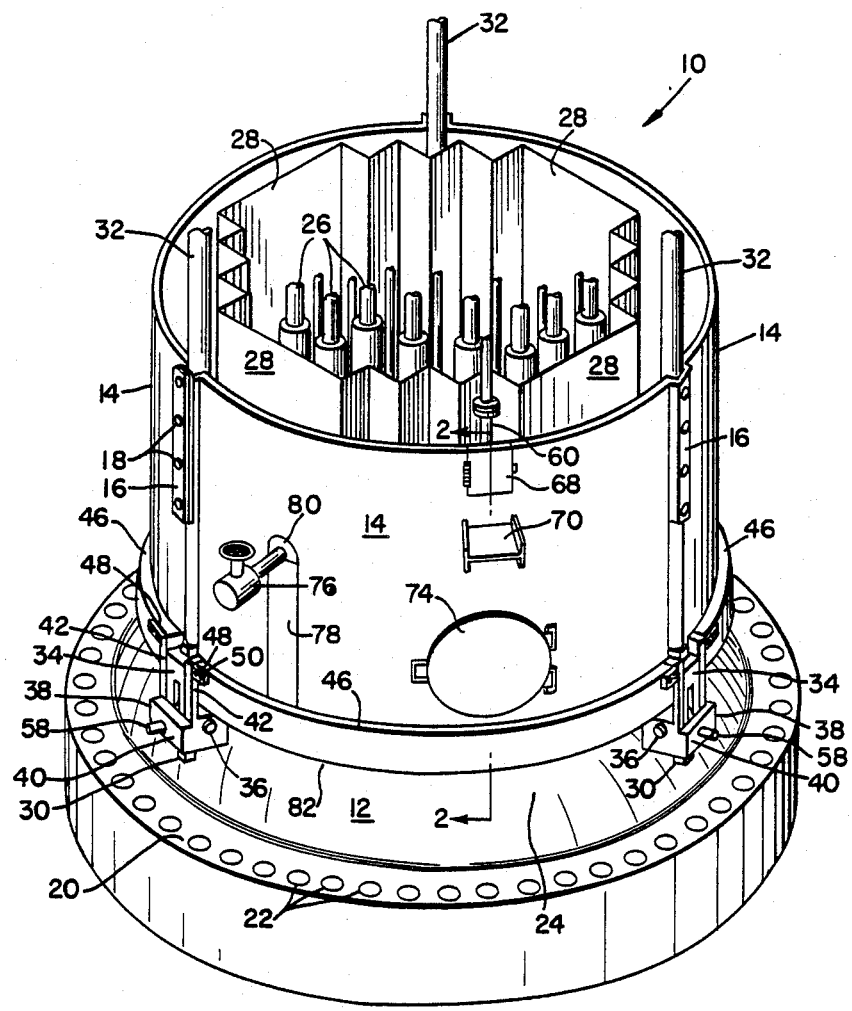
FIG. 1 is a perspective view of a nuclear reactor pressure vessel closure head having the new and improved permanently installed radiation shield of the present invention mounted thereon and showing the cooperative parts thereof.
Figure 2:
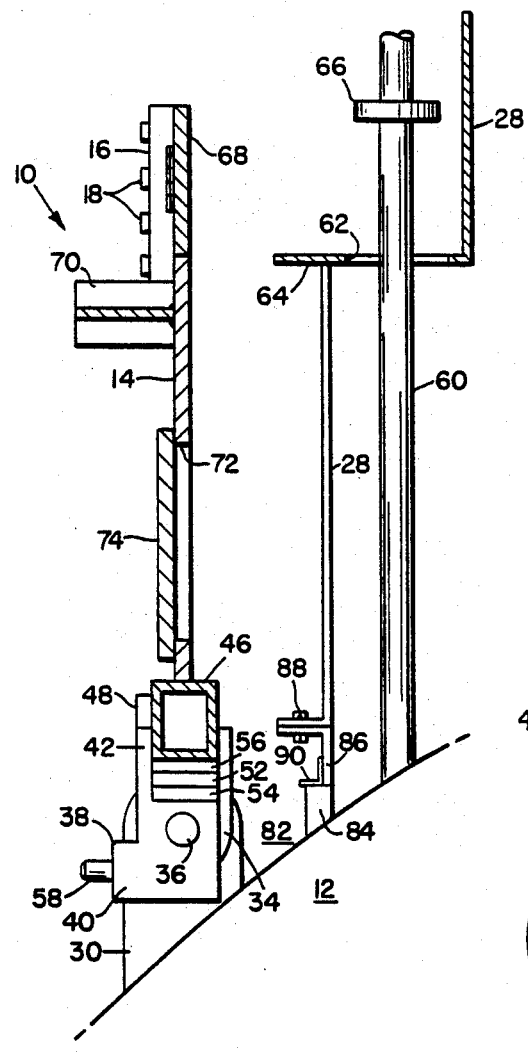
FIG. 2 is a cross-sectional view of the nuclear reactor pressure vessel closure head and radiation shield of FIG. 1 taken along the line 2—2 of FIG. 1.
Figure 3:
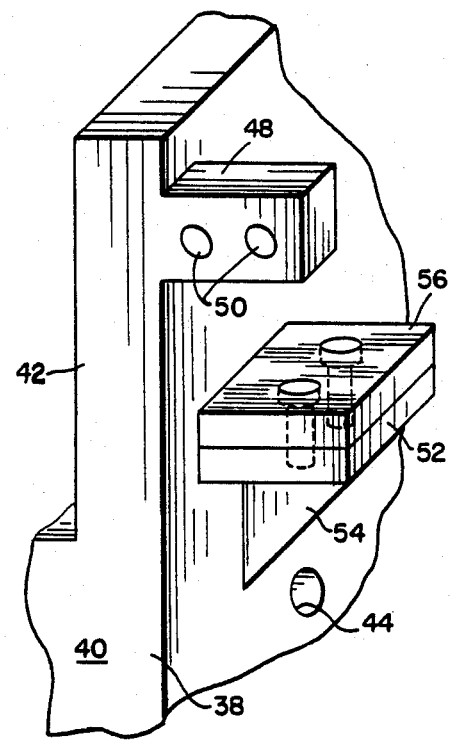
FIG. 3 is a partial perspective view of the mounting bracket support system of the present invention for supporting the radiation shield of the present invention relative to the pin-clevis-lifting lug assemblies of the closure head.

Referring now to the drawings, and more particularly to FIGS. 1–3 thereof, there is shown a first embodiment of the new and improved radiation shield of the present invention as generally indicated by the reference character 10 and which is adapted to be permanently, yet removably, secured to a nuclear reactor pressure vessel closure head 12. The shield 10 may be fabricated from any suitable material, such as, for example, ASTM-A36 carbon type steel, and is preferably formed in three, arcuate sections 14 so as to facilitate the ease of handling of the same. The lateral, vertically extending edges of each shield section 14 are provided with complimentary radially offset flanged portions 16 within the upper halves thereof so as to form overlapping joints which may be bolted together as shown at 18. Consequently, when the three shield sections 14 are in fact bolted together, the shield 10 is in the form of an upstanding cylindrical tube defining a closed periphery of 360°.

The radiation shield 10 of the present invention is particularly adapted to be mounted upon the reactor pressure vessel closure head 12, and it is seen that the head 12 is circular in horizontal cross-section and comprises a substantially flattened peripheral deck region 20 within which there is disposed a multitude of bores 22 within which tension bolts or studs, not shown, are to be secured when the closure head 12 is secured to the nuclear reactor pressure vessel, also not shown. Radially inwardly of the circumferential array of tension bolt or stud bores 22, the closure head rises from its flattened deck area 20 so as to be formed in the shape of a central domed region 24. The nuclear reactor control rod drive mechanisms (CRDMs) 26, peripherally surrounded by means of cooling baffles or shrouds 28, pass vertically through the summit portion of the domed region 24, and it is this environmental region within which radioactive deposits tend to accumulate and which therefore must be isolated or separated from the maintenance personnel working region defined within the vicinity of the closure head deck surface 20. In this manner, maintenance personnel performing detensioning and removal, or insertion and tensioning, operations in connection with the closure head tension bolts or studs will be protected from the radioation emitted from the CRDM summit region of the closure head 12.

In view of the foregoing, the radiation shield 10 of the present invention is secured to the closure head 12 so as to peripherally surround the CRDMs 26 and their cooling baffles or shrouds 28, and thereby be interposed between the CRDMs 26 and cooling baffles or shrouds 28, and the flat deck area 20 of the closure head. In particular, the radiation shield 10 of the present invention is adapted to be fixedly, yet removably, secured to existing lifting lugs 30 welded upon the closure head 12 and to which vertically extending lifting rods 32 are threadedly secured by means of clevis fittings 34 and transversely disposed pins 36. The lifting lug and lifting rod assemblies are provided upon the head 12 whereby the assemblies are disposed in an equiangularly spaced array about head 12, and the lifting rods 32 are of course adapted to be secured to a suitable lifting rig, not shown, which is employed to hoist or lower the closure head 12 relative to the reactor pressure vessel, also not shown. The lifting rods 32 are coaxially aligned with the clevis fittings 34, as are the joints defined between sections 14 of the shield 10, and in this manner, it is seen that the lifting rods 32 are interposed between the lower-half portions of the shield sections 14 and are actually accommodated within the circumferentially overlapping, radially-offset flanged portions 16 of the shield sections 14, as best seen in FIG. 1. It is noted at this juncture that flanged portions 16 extend downwardly only approximately one-half the vertical extent or height of the radiation shield 10 in order not to interfere with any tensioning or detensioning equipment which may be employed by means of the maintenance personnel when working upon the closure head tension bolts or studs disposed, or to be disposed, within bores 22.

In order to actually mount the shield 10 upon the closure head 12, mounting brackets 38 are operatively connected to the clevis fittings 34 and simultaneously pinned to the shield sections 14. Each of the mounting brackets 38 is seen to comprise a substantially rectangularly configured base 40 and a pair of laterally spaced, upstanding sidewalls 42. The clevis fittings 34 are thus interposed between the sidewalls 42 of the mounting brackets 38, and the transversely disposed pins 36 of the clevis fittings 34 pass through each sidewall 42, each leg of each clevis fitting 34, and the closure head lifting lug 30, each lifting lug 30 being interposed between the dependent legs of each clevis fitting 34. Apertures 44, as seen in FIG. 3, are of course provided within the sidewalls 42 of the mounting brackets 38 for accommodating the passage therethrough of the clevis pins 36. The lower peripheral edge of each shield section 14 has fixedly secured thereto an arcuately shaped box beam 46 in order to impart structural rigidity and strength to the shield sections 14, and in order to secure the shield 10 to the mounting brackets 38, each bracket sidewall 42 is provided with an integral, laterally outwardly extending restraint plate 48 within the upper region thereof. A pair of pins 50 is provided within each plate 48, and the pins extend radially into suitable bores, not shown, defined within the shield section box beams 46. In this manner, radial movement of the mounting brackets 38 relative to the shield 10, as will be dictated by means of thermal growth of the closure head 12 under hot power plant operating conditions, may be accommodated. As may best be appreciated from FIG. 3, actual vertical load support of the shield 10 is provided by means of laterally outwardly extending, horizontally disposed support plates 52 integrally fixed to the mounting bracket sidewalls 42 at positions vertically below restraint plates 48 and disposed radially inwardly from the front face of bracket housings or bases 40 so as to be disposed beneath the shield section box beams 46 as seen in FIG. 2. A gusset 54 may be fixedly interconnected between the distal, cantilevered edge portion of the support plate 52 and the bracket sidewall 42 or base 40 so as to impart reinforced support to the support plate 52. In order to facilitate the aforenoted radial movement of the mounting brackets 38 relative to the shield 10 under thermal growth conditions of the closure head 12, a suitable anti-frictional plate 56, which may be fabricated, for example, of bronze, is bolted atop each support plate 52 so as to be disposed directly beneath, and in contact with, the shield box beams 46. The front face of each bracket housing or base 40 is further provided with a leveling screw 58 which is adapted to operatively engage the lifting lug 30 so as to alter the vertical orientation of the mounting brackets 38 relative to the lifting lugs 30 and the clevis fittings 34 about the transverse axis defined by means of pin 36. In this manner, the shield sections will be disposed in vertically stable modes. It is to be noted at this juncture, in connection with the vertical stability of the radiation shield 10, that should one or two sections 14 of the shield 10 be removed from the head 12 so as to facilitate access by maintenance personnel to, for example, the CRDM assemblies 26, the remaining section 14 of the shield 10 will be stably retained in its vertical mode as a result of the pinned fixation of the shield section 14 with respect to the bracket restraint plates 48 as determined by means of pins 50. This stability is especially achieved in view of the fact that the bracket assemblies 38 are disposed at 120° angular intervals within a circular array about the head 12, and therefore the axes of pins 50 are disposed upon radii which are 120° apart.

One of the primary requisites in the development of a radiation shield 10 such as that of the present invention, in view of the fact that the shield 10 is effectively adapted to be permanently, although removably, secured or mounted upon the reactor pressure vessel closure head 12, was that the shield must operatively accommodate existing systems and equipment disposed upon the closure head 12. In addition to, for example, obviously accommodating the reactor CRDMs 26 and their associated shrouds or cooling baffles 28 by surrounding the same so as to protect maintenance personnel from gamma radiation normally emitted outwardly from such zones, thermocouple columnar structure 60, as best seen in FIGS. 1 and 2, projects vertically upwardly through the closure head 12 so as to, in turn, pass upwardly through an aperture 62 defined within a horizontally disposed section 64 of one of the CRDM shrouds or baffles 28. The thermocouple structure 60 is provided for indicating the temperature of the reactor water coolant, and an upper portion thereof is provided with a suitable electrical connector and pressurized seal joint 66. Access to the same is facilitated by means of a hinged access door 68 defined within a sidewall portion of the radiation shield 10 in a flush manner. A work platform 70 is fixedly secured to the outside wall of shield 10 at an elevation below thermocouple access door 68 so as to provide maintenance personnel with means for reaching access door 68 and thermocouple joint 66 disposed inside of shield 10.

In a similar manner, the CRDM assemblies 26, particularly the coil stacks, not shown, thereof, must be provided with cooling air in order to prevent degradation or deterioration of the coil assemblies, and consequently, it is conventional to provide the closure head 12 with air circulating fans, not shown, which will cause coolant air to flow downwardly over the CRDM assemblies 26 and their coil stacks so as to thereby cool the same, whereupon the air is then exhausted. Suitable ductwork, not shown, fluidically connects the CRDM baffles or shrouds 28 with the exhaust fans, and consequently, provision must be made to accommodate such fan ducts during operation of the reactor. Accordingly, three apertures 72, and hinged doors 74 for covering the apertures 72 during reactor shutdown, are provided within the shield sidewall, although only one such installation is shown. During normal reactor operation, the hinged doors 74 may be opened whereby the fan ducts fluidically connected between the fans and the CRDM baffles or shrouds 28 may be re-installed. Still further, the reactor is provided with an emergency water-gas vent line or conduit 76 whereby pressurized water and gas may be discharged from the reactor under emergency conditions. In order to likewise provide the requisite access to such vent line 76 when the radiation shield 10 of the present invention is installed upon the closure head 12, a rectangularly shaped cut-out portion is defined within a sidewall region of the shield 10 within which an access panel 78 may be bolted or otherwise secured during operation of the reactor. The vertically defined cut-out and access panel 78 permits the shield section 14 within which the cut-out and panel 78 are disposed to be installed in a vertically downward mode relative to the horizontally projecting vent line 76 until the shield section 14 is seated upon the bracket assemblies 38. A cap panel 80 is provided in association with access panel 78 so as to complete the encasement of the shield section 14 effectively about the vent line 76.

As may best be appreciated from FIGS. 1 and 2, as a result of the particular mounting system provided in accordance with the present invention for the radiation shield 10 of the present invention relative to the closure head 12, the bottom of the radiation shield 10, as defined by means of the undersurface of each box beam 46, is vertically spaced above the domed surface 24 of the closure head 12 by means of a gap 82. Insulation is normally disposed in a covering mode over the radially outer portion of the closure head 12 as defined between the CRDM baffles or shrouds 28 and the peripheral edge portion 20 of the head, and therefore, such vertical gap or spacing 82 accommodates the disposition of such insulation, not shown, upon the closure head 12 so as to minimize thermal heat loss therefrom. During reactor shutdown, the insulation may be removed from the head 12, the head 12 will cool substantially rapidly, and the maintenance personnel may perform their maintenance operations upon the closure head 12 without being burned. In order to support the insulation upon the radially outer portion of the closure head 12, the head 12 is provided with a plurality of circumfentially spaced support columns 84 upon which a shroud support ring 86 is fixedly disposed. The ring 86 has a substantially inverted L-shaped configuration, as best seen in FIG. 2, and the upper, horizontally extending leg of the ring 86 is bolted to a correspondingly horizontally projecting leg of each shroud portion 28 as seen at 88. An angle iron 90 is, in turn, fixedly secured to the support ring 86 so as to extend circumferentially about the head 12, and the head insulation is suitably secured to angle iron 90 by means of, for example, insulation clips, not shown.

Referring now to FIG. 4, a second embodiment of the radiation shield of the present invention is shown, the same being generally indicated by the reference character 110. In addition, it is noted that all parts of the radiation shield 110 which correspond to similar parts of the radiation shield 10 have been given reference characters which are the same as those in connection with the radiation shield 10 except that the reference characters of the radiation shield 110 are all within the 100 series. The radiation shield 110 differs from the radiation shield 10 of FIG. 1 in that there is disclosed a somewhat different bolting arrangement defined between the upper flanged sections 116 of the shield sections 114. In lieu of the overlapping, circumferentially extending flanged sections 16 of the shield 10, the flanged sections 116 of the shield 110 define a butt joint whereby bolt fasteners 118 may be employed to secure the sections 116 together. In addition, in accordance with an important feature of the present invention, and which is of course applicable to the embodiment of FIG. 1, if it is desired to effectively close-off the gap or vertical spacing 82 or 182 defined between the the shield box beams 46 or 146 and the closure head 12 or 112, auxiliary hinged panels 192 may be hingedly suspended from the lower end of each shield section 114 so as to be pivotable upwardly or downwardly between open and closed positions. The open, upward position would be employed during normal reactor operation whereupon the insulation covering the radially outer regions of the closure head 112 would be accommodated within space 182 and be able to pass outwardly beneath the shield 110 from the angle irons 190. During reactor shutdown, the insulation is removed and the panels 192 lowered so as to close-off the space or gap 182 and thereby prevent any gamma radiation from permeating the tension bolt or stud region of the closure head 112.

Obviously, many modifications and variations of the present invention are possible in light of the above teachings. It is therefore to be understood that within the scope of the appended claims, the present invention may be practiced otherwise than as specifically described herein.

We claim:

1. A nuclear reactor, comprising:
   a nuclear reactor pressure vessel closure head;
   a plurality of control rod drive mechanisms (CRDMs) disposed within said closure head so as to project vertically above said closure head;
   cooling air baffle means surrounding said control rod drive mechanisms for defining cooling air paths relative to said control rod drive mechanisms;
   means defined within the periphery of said closure head for accomodating fastening means for securing said closure head to its associated pressure vessel;
   a plurality of lifting lugs fixedly secured to said closure head for facilitating lifting and lowering movements of said closure head relative to said pressure vessel;
   a plurality of lift rods respectively operatively associated with said plurality of lifting lugs for transmitting load forces, developed during said lifting and lowering movements of said closure head, to said plurality of lifting lugs;
   upstanding radiation shield means interposed between said cooling air baffle means and said periphery of said enclosure head for shielding maintenance personnel operatively working upon said closure head fastening means from the effects of radiation which may emanate fron said control rod drive mechanisms and said cooling air baffle means; and
   a plurality of connecting systems respectively associated with each one of said lifting lugs and each one of said lifting rods for connecting said each one of said lifting rods to a respective one of said each one of said lifting lugs, and for simultaneously connecting a lower end portion of said upstanding radiation shield means to each one of said respective lifting lugs.

2. A nuclear reactor as set forth in claim 1, wherein:
   said radiation shield means comprises an upstanding cylindrical tube which annularly surrounds said control rod drive mechanisms.

3. A nuclear reactor as set forth in claim 2, wherein:
   said radiation shield means comprises three, equiangularly arcuate sections.

4. A nuclear reactor as set forth in claim 1, wherein each of said connecting systems for connecting said radiation shield means to said lifting lugs, comprises:
   a plurality of mounting brackets respectively associated with said plurality of lifting lugs;
   first fastening means for securing said mounting brackets to said radiation shield; and
   second fastening means for securing said mounting brackets to said lifting lugs.

5. A nuclear reactor as set forth in claim 4, wherein:
   said first fastening means comprises radially oriented pins for accomodating radial movement of said mounting brackets relative to said radiation shield under thermal growth conditions of said closure head.

6. A nuclear reactor as set forth in claim 4, wherein each of said connecting systems further comprises:
   a plurality of clevises respectively associated with said lift rods and said mounting brackets; and
   said second fastening means comprises transversely extending pins operatively connecting said mounting brackets, said clevises, and said lift lugs together
   whereby when said closure head is lifted from said pressure vessel, said radiation shield is retained upon said closure head while said lift loads are transmitted to said lift lugs through said lift rods, said plurality of clevises, and said transversely extending pins.

7. A nuclear reactor as set forth in claim 4, further comprising:
   anti-friction means fixedly secured to said mounting brackets for supporting vertical loading of said radiation shield while permitting radial movement of said mounting brackets relative to said radiation shield under thermal growth conditions of said closure head.

8. A nuclear reactor as set forth in claim 1, further comprising:
   means disposed radially outwardly of said control rod drive mechanisms and fixedly secured to said closure head for mounting closure head insulation upon said closure head; and
   said radiation shield means is vertically spaced above said closure head whereby a gap is defined between the bottom of said radiation shield means and the upper surface of said closure head for permitting said closure head insulation to pass radially outwardly from said control rod drive mechanisms and through said gap to said periphery of said closure head.

9. A nuclear reactor as set forth in claim 8, further comprising:
   auxiliary panels hingedly secured to the bottom of said radiation shield means for closing said gap defined between said radiation shield means and said closure head when said nuclear reactor has been shut down and said insulation has been removed.

10. A nuclear reactor as set forth in claim 4, further comprising:
leveling screw means mounted within each of said mounting brackets and operatively engaged with said lift lugs for properly orienting said mounting brackets and said radiation shield means in a vertically stable mode.

11. A nuclear reactor as set forth in claim 1, further comprising:
thermocouple electrical connector means disposed radially inwardly of said radiation shield means; and
access means defined within said radiation shield means for providing access by maintenance personnel to said thermocouple electrical connector means.

12. A nuclear reactor as set forth in claim 1, further comprising:
exhaust port means defined within said radiation shield means for permitting heated cooling air to be exhausted from said cooling air baffle means through said radiation shield means.

13. A nuclear reactor as set forth in claim 11, further comprising:
door means hingedly mounted upon said radiation shield means for covering said thermocouple electrical connector access means.

14. A nuclear reactor as set forth in claim 12, further comprising:
door means hingedly mounted upon said radiation shield means for covering said exhaust port means when said nuclear reactor has been shut down.

15. A nuclear reactor as set forth in claim 1, further comprising:
an emergency water-gas vent line projecting outwardly from said closure head; and
access means defined within said radiation shield means for accommodating said emergency water-gas vent line and for permitting access thereto from a position external of said radiation shield means.

16. A nuclear reactor, comprising:
a nuclear reactor pressure vessel closure head;
a plurality of control rod drive mechanism (CRDM) assemblies disposed within said closure head and projecting vertically above said closure head;
cooling air baffle means surrounding said control rod drive mechanism assemblies for defining cooling air flow paths relative to said control rod drive mechanism assemblies;
means defined within the periphery of said closure head for accomodating fastening means for securing said closure head to its associated pressure vessel;
a plurality of lifting lugs fixedly secured to said closure head for facilitating lifting and lowering movements of said closure head relative to said pressure vessel;
a plurality of lift rods respectively operatively associated with said plurality of lifting lugs for transmitting load forces, developed during said lifting and lowering movements of said closure head, to said plurality of lifting lugs;
upstanding radiation shield means annularly surrounding said cooling air baffle means so as to isolate said control rod drive mechanism assemblies and said cooling air baffle means from said periphery of said closure head and thereby shield maintenance personnel operatively working upon said closure head fastening means from exposure to radiation which may emanate from said control rod drive mechanism assemblies and said cooling air baffle means; and
a plurality of connecting systems respectively associated with each one of said lifting lugs and each one of said lifting rods for connecting said each one of said lifting rods to a respective one of said each one of said lifting lugs, and for simultaneously fixedly, yet removably, connecting a lower end portion of said upstanding radiation shield means to each one of said respective lifting lugs, each one of said plurality of connecting systems including a first clevis fixedly secured to each one of said lifting rods, a second clevis fixedly secured to each one of said lower end portions of said upstanding radiation shield means, and a transversely extending connecting pin passing through said first clevis, said second clevis, and said respective one of said lifting lugs.

17. A nuclear reactor as set forth in claim 16, wherein:
said radiation shield means is fabricated from ASTM-A36 carbon type steel.

18. A nuclear reactor as set forth in claim 17, further comprising:
box beam means integrally formed with the bottom portion of said radiation shield means for imparting structural rigidity to said radiation shield means.

19. A nuclear reactor as set forth in claim 16, wherein:
said upstanding radiation shield means comprises a rigid cylindrical tube.

20. A nuclear reactor as set forth in claim 10, wherein:
said radiation shield means comprises three, equiangularly arcuate sections.

* * * * *